F. H. RICHARDS.
Door-Springs.
No. 144,926. Patented Nov. 25, 1873.
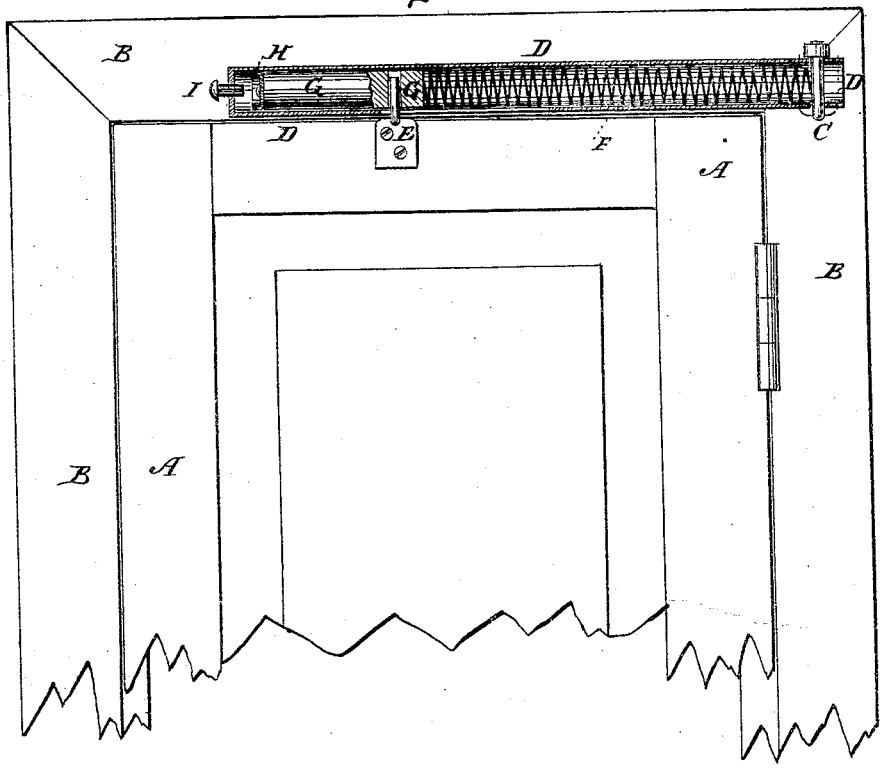
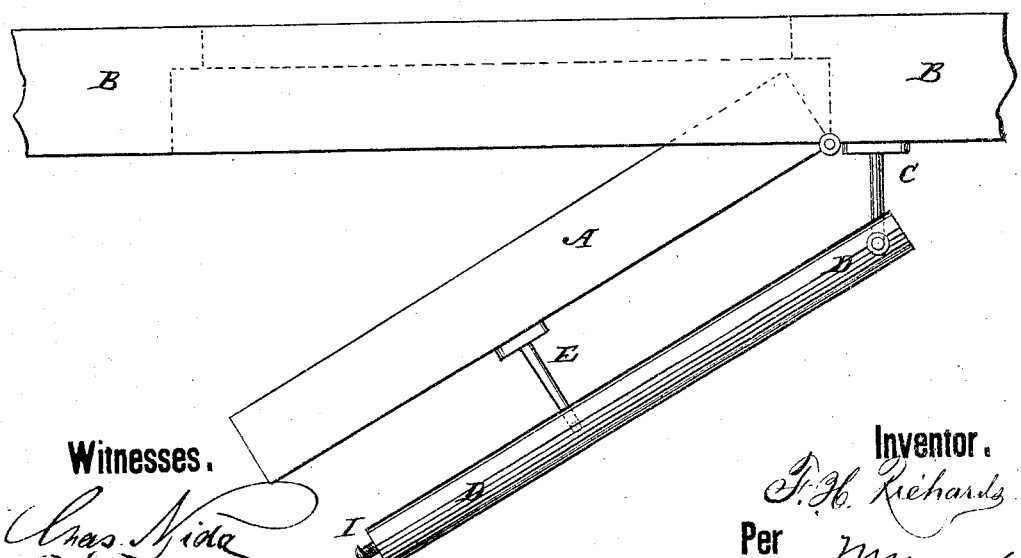

UNITED STATES PATENT OFFICE.

FRANCIS H. RICHARDS, OF NEW BRITAIN, CONNECTICUT.

IMPROVEMENT IN DOOR-SPRINGS.

Specification forming part of Letters Patent No. 144,926, dated November 25, 1873; application filed June 7, 1873.

*To all whom it may concern:*

Be it known that I, FRANCIS H. RICHARDS, of New Britain, in the county of Hartford and State of Connecticut, have invented a new and useful Improvement in Air-Cushioned Door-Spring, of which the following is a specification:

Figure 1 is a detail section of my improved device, shown as applied to a door. Fig. 2 is a top view of the same.

Similar letters of reference indicate corresponding parts.

My invention has for its object to furnish an improved device for closing doors quickly, and without slamming, and which shall at the same time be simple in construction, effective and reliable in operation, inexpensive in manufacture, strong, durable, and not liable to get out of order.

The invention consists in the combination of the piston, its cupped packing, and the tube with the brackets and the spring, or its equivalent; in the grooved screw for adjusting the vent, in combination with the packing, the piston, the tube, and the coiled spring, or equivalent; and in the employment of a bracket, working in a slot in the tube, for connecting the packed piston with the door, as hereinafter fully described.

A represents a door, and B a door-casing. C is a bracket attached to the casing B, a little in the rear of the hinged edge of the door A. The outer end of the bracket C is turned upward and passes through the end of the tube D, so as to pivot the said tube to the casing B. The forward part of the tube D is supported by the bracket E, which is attached to the upper part of the door A, and the outer end of which is bent upward and passes through a longitudinal slot in the lower side of the said tube D. In the rear part of the tube D is placed a coiled spring, F, the rear end of which rests against the bracket C, and which should be made of sufficent strength to shut the door quickly and with a slam, if allowed to act freely. The forward end of the spring F rests against the rear end of the piston G, which is attached to the end of the bracket E, so as to move back and forth through the tube D, as the said tube moves upon the said bracket E. The piston G is made of such a size as to slide freely through the tube D, and to its forward end is attached a cupped packing, H, made of leather or other suitable material, and which moves freely through the tube D as the piston G moves toward the rear end of the said tube, and which, when the piston moves forward, serves as a valve to push the air forward, and thus cushion the piston upon compressed air, so as to check the door just before it closes, and thus prevent it from slamming. The air escapes through the forward end of the tube, where its escape is regulated by the grooved screw I. If desired, the door may be closed by the operation of a weight, or by the mode of hinging said door.

Having thus described my invention, I claim as new and desire to secure by Letters Patent—

1. The combination of the piston G, cupped packing H, and tube D with the bracket C E and spring F, or equivalent, substantially as herein shown and described.

2. The grooved screw I, for adjusting the vent, in combination with the packing H, piston G, tube D, and coiled spring F, or equivalent, substantially as herein shown and described.

3. The employment of a bracket, E, working in a slot in the tube D, for connecting the packed piston with the door, substantially as herein shown and described.

FRANCIS H. RICHARDS.

Witnesses:
 JOHN DEMING,
 D. M. WOODWORD.